Patented Oct. 14, 1941

2,258,787

UNITED STATES PATENT OFFICE 2,258,787

CATALYTIC CONVERSION OF HYDROCARBON OILS

Ralph M. Melaven, Highland, Ind., and Rodney V. Shankland, Chicago, Ill., assignors to Standard Oil Company, Chicago, Ill., a corporation of Indiana No Drawing. Application January 25, 1939, Serial No. 252,774

4 Claims. (Cl. 196—52)

This invention relates to the conversion of hydrocarbon oils in the presence of catalysts and particularly to the conversion of heavy hydrocarbon oils, such as gas oil, petroleum residuums, hydrocarbon waxes, etc., into lower boiling hydrocarbons, particularly gasoline. The invention relates more particularly to the utilization of catalysts for the conversion of heavy hydrocarbon oils at high temperatures. One of the objects of the invention is to use a catalyst which will convert a larger amount of the oil into gasoline before it becomes necessary to regenerate it. Another object of the invention is to use a catalyst which may be repeatedly regenerated by treatment with an oxygen containing gas for removal of carbonaceous matter without significant loss of catalyst activity. Still another object of the invention is to use a catalyst of great physical strength which may be employed in granular form without serious disintegration. Other objects will become apparent from the following description.

The catalyst which we employ is prepared in the following manner: A silica gel, so-called, is prepared by adding a solution of soluble silicate, for example, sodium silicate, to an excess of strong mineral acid, such as hydrochloric acid or sulfuric acid. We prefer to use sodium silicate solution containing about 15% to 20% of

$$Na_2(SiO_3)_x$$

In this formula $x$ is unity or greater. The acid employed in making the gel may suitably be about 15% to 25% $H_2SO_4$ and an excess of 10% to 50% may suitably be employed. Other strong acids may be used, such as HCl, $HNO_3$, etc. We have sometimes reversed this procedure, however, and added the acid to the silicate solution which causes immediate precipitation. This method gives a very active catalyst but one of low mechanical strength.

After adding the silicate solution to the acid, and mixing, it is allowed to stand and soon the solution solidifies to a jelly. This is broken up by agitation and washed in running water until substantially all the acid and soluble salts are removed. Considerable time is required to permit all the salts to diffuse from the pieces of jelly and the washing operation is facilitated by employing hot water or by digestion and boiling. The gel is then separated from the water and dried. It now resembles an irregular sand and at this stage it is crushed and screened to remove particles which are too fine for ultimate use. The gel so prepared is characterized by possessing a submicroscopic pore structure which provides an enormous amount of "pore surface" accessible only to those materials which can freely penetrate the pores and gain access to the interior of the grains. If desired, the gel may be washed only partially at first, then partly dried and finally washed until the water gives no further test for acid ion. Also, the gel may be further washed with distilled water after final drying.

The next step in the preparation of the catalyst is to subject the gel to the action of a soluble salt of titanium under conditions such that a layer of insoluble titanium compound is deposited on the interior pore surface of the gel. Heretofore, attempts have been made to deposit metal compounds on silica gel but these attempts have usually not succeeded in accomplishing more than depositing the metal compound on the external surface of the silica gel grains. Because of the extremely small dimensions of the pores, which are of the order of 5 millimicrons in diameter, these are apparently plugged by precipitates and great care must be exercised to prevent the formation of a heavy precipitate. This we avoid by maintaining the gel in a slightly acid condition and the presence of basic precipitating reagents is scrupulously avoided.

Instead of preparing a silica gel, we may also employ precipitated silica which may be prepared according to the following procedure. Commercial water glass is diluted with an equal volume of distilled water and to this solution is added, with stirring, hydrochloric acid of 5 N. concentration until there is present about 20% of acid in excess of that required to neutralize the water glass. The precipitated silica is then washed with hot distilled water until the washings test free of chloride. About 100 grams of the moist precipitate is digested for two hours with about 3 liters of 0.1 molar titanium sulfate solution on a steam bath. This treatment causes a hydrolysis of the titanium sulfate accompanied by a deposition of a titanium compound on the surface of the silica which we believe to be an adsorbed layer of active titanium-silica compound.

The treated silica was washed three times by decantation with distilled water followed by two washings of hot water and two washings of cold water on a suction funnel using about 300 ml. of water for each washing. The washed material was finally dried at 210 to 220° F. in a steam heated drying oven, after which it was ready for use as a catalyst for promoting cracking of gas oil. It is estimated that the amount of titanium in the dried catalyst was about 0.5 wt. per cent.

When activating the gel with titanium salt, we prefer to maintain the solution slightly acid corresponding to a hydrogen ion concentration of about 0.2 to 2.5 pH. The hydrogen ion concentration will usually increase during the activation treatment. For example, in one case the pH was 0.6 at the start and 0.44 at the end of a two hour treatment of silica at 185° F.

We prefer to employ this catalyst for the cracking of hydrocarbon oils at temperatures of about 700 to 1050° F., employing contact times of between about ½ second to 5 minutes, preferably contact times within the range of 1 second to 1 minute. Contact time referred to is the time required for one volume of oil vapor at the condition of experiment to pass one volume of catalyst. We prefer to employ the new catalyst at relatively low pressures, for example, atmospheric to 50 lbs. per square inch gage. However, somewhat higher pressures, e. g., 100 to 200 lbs. per square inch may be used.

As an example of the use of the titanium-silica catalyst for the cracking of heavy petroleum oils to gasoline, the following data show the results obtained on the cracking of Mid-Continent gas oil of 35.6° A. P. I. gravity:

| | |
|---|---|
| Cracking temperature_____°F__ | 925 |
| Pressure_____ | Atmospheric |
| Volume of feed/volume of catalyst space/hour_____ | 1.21 |
| Bbls. of oil charged/tons of catalyst/hour_____ | 16.05 |
| Time of contact_____seconds__ | 7.86 |
| Length of run_____hours__ | 6.07 |
| Weight recovery, oil charged_____ _____per cent__ | 99.3 |
| Once through yields: | |
| Dry gas_____weight per cent__ | 2.25 |
| Gasoline_____volume per cent__ | 10.5 |
| Recycle stock _____do____ | 87.3 |
| Cubic feet of gas/gal. of gasoline__ | 26.2 |
| Specific gravity of gas_____ | 0.755 |
| Gasoline characteristics: | |
| End point_____°F__ | 400 |
| Gravity_____A. P. I.__ | 58.3 |
| Knock rating (from blends)_____ | |
| _____C. F. R.-M__ | 80.3 |
| Unsaturation_____per cent__ | 81.0 |
| Recycle oil: | |
| End point_____°F__ | 716 |
| Gravity_____A. P. I.__ | 35.5 |
| Unsaturation_____per cent__ | 19.4 |

The foregoing data show that the titanium-silica gel catalyst produces a good yield of gasoline with a very good knock rating. The once through yield under these conditions was 10.5% and the knock rating 80.3. Unactivated silica gel in comparison gave a yield of 9.5% and the knock rating of 72.6 C. F. R.-M. under the same conditions. The remarkable improvement in the knock rating of the gasoline, therefore, must be attributable to the titanium activation of the silica.

The enhanced effectiveness of the new catalyst is not easily explained. We believe, however, that when the silica gel is treated with the titanium salt solution, there occurs a simultaneous adsorption and hydrolysis causing the deposition of a titanium compound on the surface of the silica throughout its entire pore structure. This compound is probably an oxygen compound of titanium such as titanium hydroxide or more probably the titanium unites to form a complex compound with the SiO$_2$ molecules and hydrated SiO$_2$ molecules on the surface of the gel and within the pores of the grains thereof. It is believed that the molecules of SiO$_2$ at the surface present unsatisfied valences which form a chemical union with the titanium and its compounds so that the gel treated with titanium salt solution is substantially identical in physical structure with the untreated silica gel excepting that the entire surface, including the immense interior pore surface, is coated with not more than a monomolecular layer of titanium compound. Furthermore, we believe that the electronic structure of the titanium compound on the surface is disturbed by the unbalanced electronic structure of the SiO$_2$, previously referred to as unsatisfied valence, and that in some way the peculiarly high activity of these catalysts is related to their unbalanced electronic structure, or to the molecular orientation of the titanium compound.

As evidence of the hydrolysis of the titanium salt on the surface of the gel, we find that the solution develops a definite acidity which can only be accounted for by the following hydrolytic reaction:

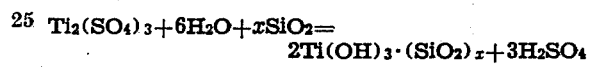

$$Ti_2(SO_4)_3 + 6H_2O + xSiO_2 = 2Ti(OH)_3 \cdot (SiO_2)_x + 3H_2SO_4$$

We choose to call this reaction an "adsorbolytic" reaction, indicating that the hydrolysis or splitting of the titanium salt is brought about by the adsorption phenomenon. Simultaneously, with the formation of acid in the solution, there is deposited within the silica a measurable amount of titanium compound which we have shown by analysis to vary between about 0.1% to 2% of titanium, depending partly on the concentration of titanium salt solution employed, the hydrogen ion concentration in the solution, and the method of treatment.

Although we prefer to use a titanium salt solution of about 0.1 molar concentration, this may be varied over a considerable range without greatly affecting the amount of titanium deposited within the gel. Thus, we may use concentrations from about 0.02 M. to 1.5 M., if desired. We may increase the amount of titanium hydrolyzed by various methods. We may also repeat the treatment of the gel with titanium solution of the same or different concentrations, or we may perform the treatment in a flowing stream. The titanium salt solution may be made to flow through a series of beds of the gel in rotation so that the most nearly spent solution serves to contact the fresh gel, thus adsorbing the greater amount of the titanium from the solution.

In the previous description the freshly prepared silica was dried after washing and before treating with the titanium solution. However, it is sometimes desirable to omit this drying step. The freshly made silica which has been thoroughly washed may be immediately treated with the titanium solution and then dried. In this case, however, a longer time is required for diffusion of the solution into the larger pieces of the silica.

As an example of the activation of silica with titanium salt solution, in one case we treated titanium oxide with hydrofluoric acid and precipitated titanium hydroxide by ammonium hydroxide. The titanium hydroxide was washed with distilled water and dissolved in H$_2$SO$_4$, using about 5% to 10% of excess acid over that theoretically required. Freshly precipitated silica was added to the titanium sulfate solution and heated for about 2 hours to permit complete penetration and activation of the silica. The silica was then separated and washed with water until free of sulfuric acid. After drying, the catalyst was ready for use. In place of using the sulfate, we may use other soluble salts of titanium, for example, the chloride.

As indicated above, the catalyst may be regenerated after it has become fouled with carbonaceous deposits in the cracking operation. Regeneration is most conveniently accomplished by passing a stream of air and inert gas, for example, steam, through the catalyst bed, care being taken to control the oxygen concentration of the regenerating gas so that the combustion temperature is kept below about 1200° F. and preferably below about 1100° F. Excessive heating above these temperatures causes catalyst deterioration.

After regeneration, the cracking may be continued. The duration of cracking between regeneration periods may be about 5 hours but this depends largely on the nature of the stock being cracked. If the stock cracked is a residual oil containing asphaltic matter, the duration of cracking is considerably less before catalyst activity is seriously reduced. Thus, with a typical Mid-Continent residual oil of about 22° A. P. I. gravity, the catalyst may be used for a period of about 30 minutes to 2 hours between regenerations. When using gas oil, we have found that in a typical operation the catalyst activity has decreased about 25% to 50% in a period of 6 hours. In the case of residual oils or very heavy distillate charging stocks, we may initially crack the oil in one catalyst bed and produce intermediate boiling hydrocarbons with very little gasoline. Then we may pass the vapors directly into a second catalyst bed with or without heating to a higher temperature to complete the cracking. The extent or depth of cracking per pass depends partly on the freshness of the catalyst and on the temperature. If desired, the process may be conducted to produce from gas oil about 45% to 55% of gasoline in a single pass and the uncracked products heavier than gasoline may be either recycled in the operation or cracked in a secondary cracking operation. Alternatively, the extent of cracking may be maintained about 20% to 30% and the uncracked heavy products may be recycled until completely cracked, the only products being gasoline and gas. Carbonaceous matter produced in the operation, is deposited on the catalyst and removed in regeneration.

If desired, we may employ the catalyst in moving bed apparatus in which a portion of the spent catalyst is continuously withdrawn and regenerated externally, fresh and/or regenerated catalyst being supplied continuously to the apparatus. We may also employ the catalyst in finely divided form. For example, the catalyst may be finely divided by grinding and supplied as a slurry in oil to the cracking chamber or coil or introduced as a powder into the vapor stream. In this type of operation, the spent catalyst is settled or filtered from the products and separately regenerated.

Although we have given specific examples of methods of preparing the catalyst and have described its use in certain cracking operations, we intend that our invention be limited only by the following claims.

We claim:

1. The process of converting heavy hydrocarbon oils into gasoline comprising vaporizing said oils and subjecting the vapors at a temperature between about 700 and 1050° F. to the action of a catalyst consisting essentially of silica gel promoted by titanium, said catalyst being made by treating said gel with a titanium compound in an acid solution and thereafter washed and dried.

2. The process of converting heavy hydrocarbon oils into gasoline which comprises vaporizing said oils and subjecting the vapors at a temperature between about 700 and 1050° F. to the action of a catalyst comprising silica gel activated by a film of a titanium compound adsorbed from an acid solution of a titanium salt, and catalyst containing about 0.1% to 2% of titanium.

3. The process of converting heavy hydrocarbon oils into gasoline comprising vaporizing said oils and subjecting the vapors at a temperature between about 700 and 1050° F. to the action of a catalyst consisting essentially of silica gel and a titanium compound deposited thereon by adsorbolytic reaction in an acid solution.

4. The process of claim 3 wherein said acid solution has a hydrogen ion concentration between about pH=0.2 and pH=2.5.

RALPH M. MELAVEN.
RODNEY V. SHANKLAND.

CERTIFICATE OF CORRECTION.

Patent No. 2,258,787.

October 14, 1941.

RALPH M. MELAVEN, ET AL.

It is hereby certified that error appears in the printed specification of the above numbered patent requiring correction as follows: Page 3, second column, line 37, claim 2, for the word "and" read --said--; and that the said Letters Patent should be read with this correction therein that the same may conform to the record of the case in the Patent Office.

Signed and sealed this 25th day of November, A. D. 1941.

(Seal)

Henry Van Arsdale,
Acting Commissioner of Patents.